(12) United States Patent
Maillet et al.

(10) Patent No.: US 6,576,705 B1
(45) Date of Patent: Jun. 10, 2003

(54) THERMOPLASTIC RESIN COMPOSITION AND MOLDED ARTICLES

(75) Inventors: Jerome Maillet, Kyoto (JP); Takatoshi Kuratsuji, Kyoto (JP); Alain Bouilloux, Bernay (FR); Yves Germain, Serquigny (FR)

(73) Assignee: Elf Atochem S.A., Puteaux (FR)

( * ) Notice: Subject to any disclaimer, the term of this patent is extended or adjusted under 35 U.S.C. 154(b) by 0 days.

(21) Appl. No.: 09/117,872

(22) PCT Filed: Nov. 27, 1997

(86) PCT No.: PCT/EP97/06941

§ 371 (c)(1),
(2), (4) Date: Feb. 9, 1999

(87) PCT Pub. No.: WO98/26004

PCT Pub. Date: Jun. 18, 1998

(30) Foreign Application Priority Data

Dec. 10, 1996 (JP) .............................. 8-329247

(51) Int. Cl.⁷ .............................................. C08L 67/02
(52) U.S. Cl. .............................. 525/63; 525/66; 525/69; 525/123; 525/177; 525/184; 428/35.1
(58) Field of Search .............................. 525/63, 66, 69, 525/123, 177, 184; 428/35.1

(56) References Cited

U.S. PATENT DOCUMENTS

| 4,739,012 A | 4/1988 | Hagman ..................... 525/92 |
| 4,812,505 A | 3/1989 | Topcik ........................ 524/377 |
| 5,059,481 A | * 10/1991 | Lustig et al. ............... 428/516 |
| 5,306,549 A | 4/1994 | Isozaki ....................... 428/220 |

FOREIGN PATENT DOCUMENTS

| DE | 195 22 333 | 12/1995 |
| EP | 296355 | 12/1988 |
| EP | 450088 | 10/1991 |
| EP | 459862 | 12/1991 |
| EP | 559284 | 9/1993 |
| EP | 657502 | 6/1995 |
| EP | 675167 | 10/1995 |
| EP | 735545 | 10/1996 |
| EP | 737709 | 10/1996 |
| EP | 787761 | 8/1997 |
| EP | 787771 | 8/1997 |
| JP | 47-23478 | 10/1972 |
| JP | 56-45419 | 4/1981 |
| JP | 62-148247 | 7/1987 |
| JP | 1-163234 | 6/1989 |
| JP | 2-85181 | 3/1990 |
| JP | 3-14480 | 1/1991 |
| WO | 90/13544 | 11/1990 |
| WO | 96/25451 | 8/1996 |

OTHER PUBLICATIONS

L.D. Cady, C. J Roffer; Films, Polyethylene, Linear Low–Density & Ultra Low–Density; Packaging's Encyclopedia pp. 41–42, 1988.*

International Search Report daed Jun. 4, 1998.

* cited by examiner

Primary Examiner—Rachel Gorr
(74) Attorney, Agent, or Firm—Smith, Gambrell & Russell, LLP

(57) ABSTRACT

The objective of the present invention lies in providing a resin composition which enables water vapor permeability to be controlled over a broad range while maintaining a high gas permeability, together with molded articles or packaging materials comprising said composition, in particular a packaging material for foodstuffs like fruit and vegetables. A thermoplastic resin composition which is characterized in that a polymer (A) containing polyether chains as structural units, polyethylene (B) of density as specified in JIS K6760 of less than 0.91 g/cm³ and a compatibilizing agent (C) are blended together in proportions by weight of A/B/C=99.5 to 0.5/0.5 to 99.5/0 to 30 (where A+B+C=100); and molded articles comprising said composition, in particular a packaging material for vegetables and fruit cultivation or foodstuffs storage.

10 Claims, No Drawings

THERMOPLASTIC RESIN COMPOSITION AND MOLDED ARTICLES

FIELD OF THE INVENTION

The present invention relates to a thermoplastic resin composition and moulded articles thereof. The objective lies in providing a resin composition which, while maintaining high gas permeability, permits water vapour permeability to be controlled over a broad range; together with moulded articles or packaging materials comprising this composition, in particular a packaging material for foodstuffs like fruit and vegetables.

BACKGROUND OF THE INVENTION

Thermoplastic resins such as polyolefins have been widely used hitherto in applications of various kinds on account of their ease of handling and good balance of properties, and they are also valuable as packaging materials. In such circumstances, depending on the resin used, various types of material can be designed and employed according to the particular objectives, ranging from permeable films with high gas permeability to barrier materials with low permeability, but few are endowed with high water vapour transmission. Techniques are known where, for example, a highly permeable material and a material of low permeability are blended or laminated. However, when used for storing foodstuffs, there have been problems such as water vapour condensing in the interior and water droplets adhering, so that the interior cannot be viewed, or the condensed moisture hastens deterioration of the contents and rotting tends to occur. Moreover, there have been limits to the control of gas permeability where longer term storage has been attempted.

For the purposes of resolving these difficulties, there is known the introduction of minute holes in the film either mechanically by means of a needle, etc, or physicochemically by means of a laser, etc, with the permeability being controlled by hole diameter and the density of such holes present (see, for example, Japanese Unexamined Patent Publication Nos 47-23478, 62-148247 and 2-85181, etc). Further, there has been proposed raising the water vapour permeability by producing extremely thin regions locally in the film without going so far as to introduce holes. However, in these methods, not only is there a considerable difference in permeability between the fine hole regions and other regions so that it is difficult to obtain uniformity over the film as a whole, but there are also problems such as the film strength being weakened and the selectivity of the permeability being reduced.

On the other hand, methods have also been proposed in which any attempts at raising the permeability of the film itself are abandoned, so that the gases which control metabolic action are trapped inside, and instead an adsorbent for the harmful gases and moisture is introduced (see, for example, Japanese Unexamined Patent Publication No. 3-14480, etc). However, such methods are troublesome and, moreover, their effect is not necessarily adequate.

Now, compositions comprising a polyether-containing block polyamide, etc, along with a polyolefin and/or functional polyolefin are already known (see, for example, Japanese Unexamined Patent Publication No. 1-163234, and European Patent Publication Nos 459862, 475963, 559284, 657502 and 675167, etc). As effects, there are described moisture transmission, high impact resilience and antistatic properties, etc. However, only a general description is given of the polyolefin, and there is no mention of paying attention to the density thereof to control the gas permeability.

DESCRIPTION OF THE INVENTION

The present invention has been made based on the discovery that, in trying to control the water vapour permeability within a desired range while maintaining a high gas permeability, this objective may be realised by incorporating resin of specified density.

The present invention is a thermoplastic resin composition which is characterized in that a polymer (A) containing polyether chains as structural units, polyethylene or copolymer in which polyethylene is the chief component (B) of density as specified in JIS K6760 of less than 0.91 g/cm$^3$ and a compatibilizing agent (C) are blended in proportions by weight of A/B/C=99.5 to 0.5/0.5 to 99.5/0 to 30 (where A+B+C=100); together with moulded articles or packaging materials thereof.

In the present invention, the 'polymer (A) containing polyether chains as structural units' means a block copolymer in which polyoxyalkylene chains and other polymer chains are linked together, or a polymer in which polyoxyalkylene chains are connected together via coupling regions. Examples of the polyoxyalkylene here are polyoxyethylene, poly(1,2- and 1,3-oxypropylene), polyoxytetramethylene, polyoxyhexamethylene, ethylene oxide and propylene oxide block or random copolymers, ethylene oxide and tetramethylene oxide block or random copolymers, and the like. In particular, those with from 2 to 4 carbons in the alkylene moiety are preferred, with polyoxyethylene being most preferred. The number average molecular weight of the polyoxyalkylene is from 200 to 6000, and preferably from 300 to 4000.

The preferred 'polymer (A) containing polyether chains as structural units' employed in the present invention is a polyether-polyamide block copolymer, polyether-polyester block copolymer or polyether-urethane. Amongst these, the polyether-polyamide block copolymer is especially preferred.

The 'polyether-polyamide block copolymer' used in the present invention is a polymer in which there are linked together polyoxyalkylene chains (a) and polyamide chains (b), where the latter comprises polymer of an aminocarboxylic acid or lactam with six or more carbons, or of a salt of dicarboxylic acid and diamine with at least six carbons. Where (a) and (b) are connected together via a dicarboxylic acid with from 4 to 20 carbons, the material is generally referred to as a polyetheresteramide, and this too will be included in the invention. Here, as the 'aminocarboxylic acid or lactam with six or more carbons, or salt of dicarboxylic acid and diamine with at least six carbons', there is preferably used 11-aminoundecanoic acid, 12-aminododecanoic acid, caprolactam, laurolactam, hexamethylenediamine/adipic acid salt or hexamethylenediamine/sebacic acid salt, etc. Further, two or more types of the aforesaid (a) and (b) components can be used together.

This polymer is produced, for example, by the method described in Japanese Examined Patent Publication No. 56-45419, etc. Specific examples of such polymers are Pebax (Elf Atochem), ELY (EMS) and Vestamid (Höls), etc. The type and weight ratio of the polyether and polyamide components in the block copolymer used in the present invention are selected according to the objectives and application. From the point of view of water vapour permeability, water resistance and the handling properties, etc, a polyether/polyamide ratio of from 4/1 to 1/4 is preferred.

The 'polyether-polyester block copolymer employed' in the present invention is a polymer in which there are linked together polyoxyalkylene chains (a) and polyester chains (d), where the polyester is a polymer of a hydroxycarboxylic acid with six or more carbons, or of a dihydroxy compound with two or more carbons and an aromatic dicarboxylic acid. Further, two or more types of these (a) and (d) components can be jointly used. This polymer is, for example, produced by the method described in U.S. Pat. No. 4,739,012. Specifically, there can be cited Hytrel (DuPont), Pelprene P type (Toyobo) and Rekuse (Teijin). The weight ratio of the aforesaid (a) and (d) components in the block copolymer used in the present invention will be determined by the objectives and application. Although being thermoplastic polyester elastomers in the same way, with polyester-polyester block copolymers (for example Pelprene S type) here is little effect.

The 'polyether-urethane' employed in the present invention is a thermoplastic polyurethane in which the polyether is used as the soft segments. There is little effect with polyester type or caprolactone type polyurethanes. Specifically, the polyether-urethane is normally obtained by the reaction of an organic di-isocyanate and a polyether of molecular weight 500 to 6000 and, depending on the circumstances, with chain extension being conducted in the presence of catalyst.

As the isocyanate, there is preferably used tolylene diisocyanate or diphenylmethane diisocyanate, etc, and as the polyether, there is preferably used poly-tetramethylene glycol, polypropylene oxide or polyoxyethylene.

In the present invention, these polyether-polyamide block copolymers, polyether-polyester block copolymers or polyether-urethanes may be used singly, or as mixtures thereof, or, in the case of the block copolymers, there may be used mixtures of two or more polymers having different types and/or ratios of soft/hard segments in each resin, or again there may be used blends with other resins providing that the amount is within a range such that the objectives of the present invention are realised.

In the present invention, 'polyethylene or copolymer in which polyethylene is the chief component (B) of density as specified in JIS K6760 of less than 0.91 g/cm$^3$' refers to an ethylene homopolymer, or copolymer of ethylene and no more than 10 to 20 mol % of an α-olefin monomer (comonomer), where said polymer or copolymer has a density as specified in JIS K6760 of less than 0.91 g/cm$^3$. Thus, the ordinary general-purpose polyethylenes, i.e. the polyethylenes (of density 0.91 g/cm$^3$ and above) which are specified in JIS K6748 or ASTM D1248 are not included, and they lie outside the scope of the present invention. It is further preferred that the density be less than 0.90 g/cm$^3$.

This polyethylene or copolymer in which polyethylene is the chief component is obtained by conventionally-known polymerization methods, i.e. the homopolymerization of ethylene or the copolymerization of ethylene and an α-olefin monomer (comonomer) (such as propene, butene, hexene, octene, decene or 4-methyl-1-pentene, etc) by the high pressure radical polymerization method based on oxygen or peroxide catalysts, the medium/low pressure co-ordination polymerization method based on Ziegler Natta catalysts or silica- or alumina-supported catalysts, or the polymerization method based on 'single site catalysts (SSC)' with uniform points of activity as typified by Kaminsky type metallocene catalysts. As examples of such ultra-low density polyethylene or copolymer in which polyethylene is the chief component, there are Rumitakku 9P107T or 43-1 (Toray), Eboryu SP0540 (Mitsui Petrochemical), Engage EG8150 or 8100 (Dow Chemical), and Affinity PF1140, PL1880 or FW1650 (Dow Chemical), etc.

Of these, for a given density, polyethylene or copolymer in which polyethylene is the chief component which is based on a single site catalyst is especially preferred.

In the present invention, depending on the circumstances, a compatibilizing agent (C) can be used. In the present invention 'compatibilizing agent (C)' is a polymer employed for enhancing the miscibility of the polymer (A) containing polyether chains as structural units, and the polyethylene (B) of density less than 0.91 g/cm$^3$, and it comprises one or more than one type of polymer selected from the group comprising 'polyolefins or (meth)acrylate or vinyl acetate copolymers thereof which have been grafted or co-polymerized with unsaturated carboxylic acids, unsaturated carboxylic acid anhydrides or unsaturated epoxides'. Specific examples are maleic anhydride grafted polyethylene or polypropylene, ethylene/maleic anhydride copolymer, ethylene/alkyl acrylate/maleic anhydride terpolymer, ethylene/vinyl acetate/maleic anhydride terpolymer and ethylene/alkyl acrylate/glycidyl methacrylate terpolymer, etc.

The mixing proportions by weight of the polymer (A) containing polyether chains as structural units, the polyethylene or copolymer in which polyethylene is the chief component (B) of density less than 0.91 g/cm$^3$, and the compatibilizing agent (C), are A/B/C=99.5 to 0.5/0.5 to 99.5/0 to 30, and preferably 95 to 5/5 to 95/1 to 20. In the storage of an item which exhibits marked respiration, then the range A/B/C=99 to 55/1 to 45/0 to 30, and preferably 90 to 60/10 to 40/1 to 20 is recommended, and in the storage of a comparatively readily dried item, then the range A/B/C=45 to 1/55 to 99/0 to 30, and preferably 40 to 5/60 to 95/1 to 20 is recommended. In such circumstances, A+B+C=100 in each case. By blending these components in the stated proportions, it is possible to control the water vapour permeability over a broad range while maintaining a high gas permeability.

In regard to this resin composition, the respective resins can be dry blended in the specified proportions and then directly extruded to produce a moulded article, or, prior to moulding, (A), (B) or (C) can be melt blended and formed into pellets beforehand, or (A) and (C), or (B) and (C) can be blended beforehand and then, at the time of moulding, the blend along with (B) or (A) extruded or injection moulded to produce the moulded article. In other words, a so-called master batch method can also be employed. The melt blending is conducted using an ordinary single screw or twin screw extruder, etc. The melting temperature will depend on the types and proportions of the resins but, in general, from 120 to 230° C. is employed.

In the resin composition of the present invention, there can be freely included known antioxidants, thermal decomposition preventives, ultraviolet light absorbers, hydrolysis resistance improvers, colouring agents (dyes and pigments), antistatic agents, electrical conductors, crystal nucleating agents, crystallization promoters, plasticizers, ready-slip agents, lubricants, release agents, flame retardants, flame retarding auxiliaries or the like, within a range such that the characteristics of the invention are not lost.

The resin composition of the present invention can be used as it is to produce extruded articles such as sheet, film or tube, etc, or injection moulded articles such as containers, and it can also be used after blending with other thermoplastic resins. When producing extruded articles, as well as inflation, various other methods such as the T-die system can be employed.

EXAMPLES

Below, the present invention is explained in more specific terms by means of examples, but it goes without saying that the invention is not to be restricted just to these examples. Now, the various property values in the examples were measured by the following methods.

(1) Density (units: g/cm³) Measured based on JIS K6760
(2) MFI (units: g/10 minutes) Melt Flow Index Measured at a load of 2.16 kg, 190° C., based on JIS K6760
(3) Intrinsic viscosity (units: g/dl) This was calculated from the solution viscosity measured at 20° C. using a m-cresol solution of the polymer.
(4) Moisture transmission (water vapour permeability) (units: g/m².day) Film was subjected to measurement based on JIS Z0208, under conditions B (40° C., 90% relative humidity)
(5) Gas permeability (units: ml/m².day.atm) Measurement was carried out by the pressure difference method. The specific conditions were as follows.

device: gas permeability measurement device model GTR-10XE made by Yanako Bunseki Kogyo (Co.)
test area: 15.2 cm² (44 mm diameter)
detection method: working curve system based on a gas chromatograph with TCD attached temperature,
relative humidity: 25° C., 0% RH
carrier-gas: helium 70 KPa
diffused gas: $CO_2/O_2/N_2/C_2H_4$ (30.0/30.0/39.12/0.88 vol %).

Further, the resins employed were as follows.

A-1: polyetheresteramide of intrinsic viscosity about 1.5, comprising polyoxyethylene chains (average molecular weight 1500) and polyamide 12 chains (average molecular weight 1500)

A-2: polyetheresteramide of intrinsic viscosity about 1.5, comprising polyoxyethylene chains (average molecular weight 1500) and polyamide 12 chains (average molecular weight 4500)

A-3: polyetheresteramide, comprising polyoxyethylene chains (average molecular weight 1500) and polyamide 6 chains (average molecular weight 1500)

B-1: polyethylene of MFI 5 and density 0.87 obtained by polymerization using a metallocene catalyst B-2: polyethylene of MFI 1.6 and density 0.895 obtained by polymerization using a metallocene catalyst B-3: polyethylene of MFI 4 and density 0.905 obtained by polymerization using a metallocene catalyst B-4: polyethylene of MFI 8 and density 0.905 obtained by radical polymerization B-5: polyethylene of MFI 4 and density 0.920 obtained by polymerization using a metallocene catalyst B-6: polyethylene of MFI 4 and density 0.920 obtained by radical polymerization C-1: ethylene/acrylate/maleic anhydride terpolymer containing 6 wt % comonomer and 3 wt % maleic anhydride C-2: ethylene/glycidyl methacrylate copolymer containing 8 wt % of glycidyl methacrylate.

EXAMPLES 1 to 6

Comparative Examples 1 and 2

Composition Nos 1 to 8 were obtained by mixing together resins A, B and C at a weight ratio of A/B/C=30/55/15, and then melt extruding with a twin-screw extruder set at 160–180° C., after which pellets were produced. Film of thickness 25μ was obtained from the pellets using a single screw extruder fitted with a T-die, the tip of which was set at 180° C. The properties of the film in each case are shown in Table 1. Where film was produced from Composition Nos 7 and 8, which employed polyethylene of density over 0.91, although the moisture transmission was about the same, only poor gas permeability was obtained (Comparative Examples 1 and 2). Further, in the case of polyethylenes of the same density, the material which had been polymerized by means of a single site catalyst showed slightly better gas permeability (contrast Examples 5 and 6; Comparative Examples 1 and 2).

TABLE 1

| | Composition Number | A | B | C | Moisture Transmission | $CO_2$ Gas Permeability | Oxygen Gas Permeability |
|---|---|---|---|---|---|---|---|
| Example 1 | Composition 1 | A-1 | B-2 | C-1 | 140 | 105,000 | 18,100 |
| Example 2 | Composition 2 | A-2 | B-2 | C-1 | 125 | 72,400 | 15,200 |
| Example 3 | Composition 3 | A-2 | B-2 | C-2 | 130 | 73,000 | 15,500 |
| Example 4 | Composition 4 | A-2 | B-1 | C-1 | 170 | 105,200 | 23,000 |
| Example 5 | Composition 5 | A-2 | B-3 | C-1 | 80 | 65,000 | 13,300 |
| Example 6 | Composition 6 | A-2 | B-4 | C-1 | 90 | 60,000 | 12,300 |
| Comp. Ex. 1 | Composition 7 | A-2 | B-5 | C-1 | 70 | 43,700 | 8,800 |
| Comp. Ex. 2 | Composition 8 | A-2 | B-6 | C-1 | 85 | 41,500 | 8,400 |

EXAMPLE 7

Comparative Examples 3 to 5

Film produced from Composition Nos 2 and 8 was cut to A4 size and then, in each case, two pieces placed one on the other, and three sides heat-sealed to produce a bag. A bunch (about 500 g) of grapes (Kyoho grapes) was placed inside, and then the final edge heat-sealed. For comparison, bunches were packaged in the same way using a paper bag of the kind employed in grape cultivation and also using a commercial 25μ thickness low density polyethylene bag. The bags containing the grapes were kept for 1 month in a refrigerator at 5° C., after which they were withdrawn and the contents checked. In the case of the paper bag, it was found that the stems had turned brown and individual grapes had tended to drop away from the bunch (Comparative Example 3). Further, in the case of the commercial polyethylene bag, numerous water droplets adhered to the bag, and white mould was growing on the grapes (Comparative Example 4). Moreover, while the bunch which had been packed in the film bag from Composition No. 8 essentially looked good, the grapes had lost some of their flavour (slight smell of alcohol) (Comparative Example 5). In contrast, in the case of the bunch which had been packed in the film bag from Composition No. 2, the stems still looked fresh and green, and the flavour of the grapes was excellent (Example 7).

EXAMPLE 8

Comparative Example 6

Film having a composition of A/B/C=65/25/10 by weight was produced in the same way as in Example 1, and the properties are shown in Table 2. It can be seen that, even though samples of film may have about the same moisture transmission, film based on polyethylene of high density has inferior gas permeability.

TABLE 2

| | Composition Number | A | B | C | Moisture Transmission | $CO_2$ Gas Permeability | Oxygen Gas Permeability |
|---|---|---|---|---|---|---|---|
| Example 8 | Composition 9 | A-2 | B-2 | C-1 | 780 | 54,900 | 7,000 |
| Comp. Ex. 6 | Composition 10 | A-2 | B-6 | C-1 | 800 | 43,000 | 5,000 |

EXAMPLE 9

Comparative Example 7

The lid was removed from a corrugated cardboard box for holding 22 peaches, and then 22 peaches introduced immediately after they had been picked from the tree. The entire pack was then wrapped in either film from Example 8 or nylon film, and heat-sealed. After keeping for 7 days at room temperature (23° C.), the gas inside the pack was sampled and analysed, after which the pack was broken open and the contents examined. The peaches which had been packed using the film from Example 8 all still had a good appearance, there was nothing irregular when the insides were cut open with a kitchen knife, and the taste was good. Further, the gas concentrations inside the pack were carbon dioxide=6% and oxygen=7% (Example 9). On the other hand, in regard to the peaches which had been packed using nylon film, three of the 22 peaches had spoiled and darkened, and there was a considerable smell of alcohol. The gas concentrations inside the pack were carbon dioxide=15% and oxygen=12%, and it was inferred that, with the gas permeability being low, there had been some anaerobic fermentation (Comparative Example 7).

EFFECTS OF THE INVENTION

As explained above, in the composition of the present invention, there is blended, with a polymer which has polyether chains, a specified proportion of polyethylene or copolymer in which polyethylene is the chief component having a specified density and, in this way, it is possible to obtain moulded articles with a desirable water vapour permeability over a broad range while still maintaining a high gas permeability and, in particular, it is possible to offer a packaging material for the cultivation or storage of fruit and vegetables.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A thermoplastic resin composition comprising:
   (A) a polymer containing polyether chains as structural units,
   (B) polyethylene or a copolymer in which polyethylene is the substantial component of a density specified by JIS K6760 of less than 0.91 g/cm$^3$, and
   (C) a compatibilizing agent,
   blended in proportions by weight of A/B/C=99.5 to 0.5/ 0.5 to 99.5/0 to 30 (where the total of A+B+C=100),
   wherein said composition has carbon dioxide gas permeability above about 54,900 ml/m$^2$.day.atm and oxygen gas permeability above about 7,000 ml/m$^2$.day.atm.

2. A thermoplastic resin composition according to claim 1, wherein the polymer (A) containing polyether chains as structural units is at least one member of the group consisting of polyether-polyamide block copolymers, polyether-polyester block copolymers and polyether-urethanes.

3. A thermoplastic resin composition according to claim 2, wherein the polyether chains are polyoxyethylene chains.

4. A thermoplastic resin composition according to claim 1, wherein the density of (B) the polyethylene or copolymer in which polyethylene is the substantial component is less than 0.90 g/cm3.

5. A thermoplastic resin composition according to claim 1, wherein (B) the polyethylene or copolymer in which polyethylene is the substantial component is produced by a single site catalyst.

6. A thermoplastic resin composition according to claim 1, wherein the compatibilizing agent (C) is at least one member selected from the group consisting of polyolefins or the (meth)acrylate or vinyl acetate copolymers thereof which have been grafted or co-polymerized with unsaturated carboxylic acids, unsaturated carboxylic acid anhydrides or unsaturated epoxides.

7. Molded articles formed from the composition of claim 1.

8. Packaging materials comprising the molded articles of claim 7.

9. Packaging materials according to claim 8, comprising molded articles for the cultivation or storage of fruit or vegetables.

10. Packaging materials according to claim 8, wherein the articles are film, sheet or bags.

* * * * *